(No Model.)  W. P. CLARK.  2 Sheets—Sheet 2.
APPARATUS FOR DRAWING SODA WATER AND OTHER BEVERAGES.
No. 248,918. Patented Nov. 1, 1881.
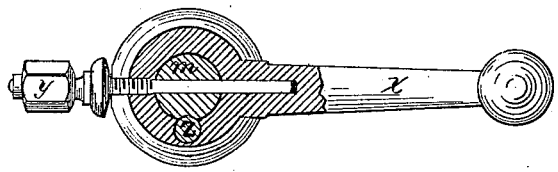
Fig. 3.
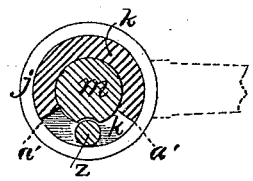
Fig. 4.
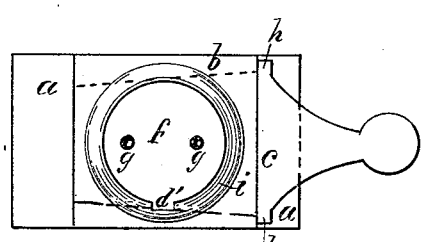
Fig. 9.
Fig. 8.
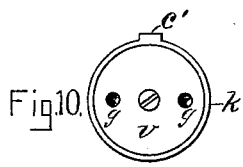
Fig. 10.
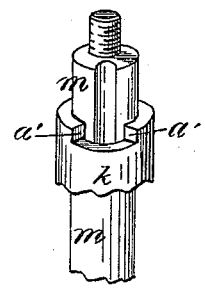
Fig. 6.
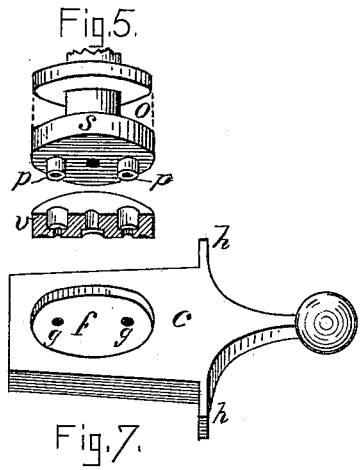
Fig. 5.
Fig. 7.
Witnesses.
H. E. Remick
Wm. H. Mann
Inventor.
William P. Clark
By Porter & Hutchinson
Attys.

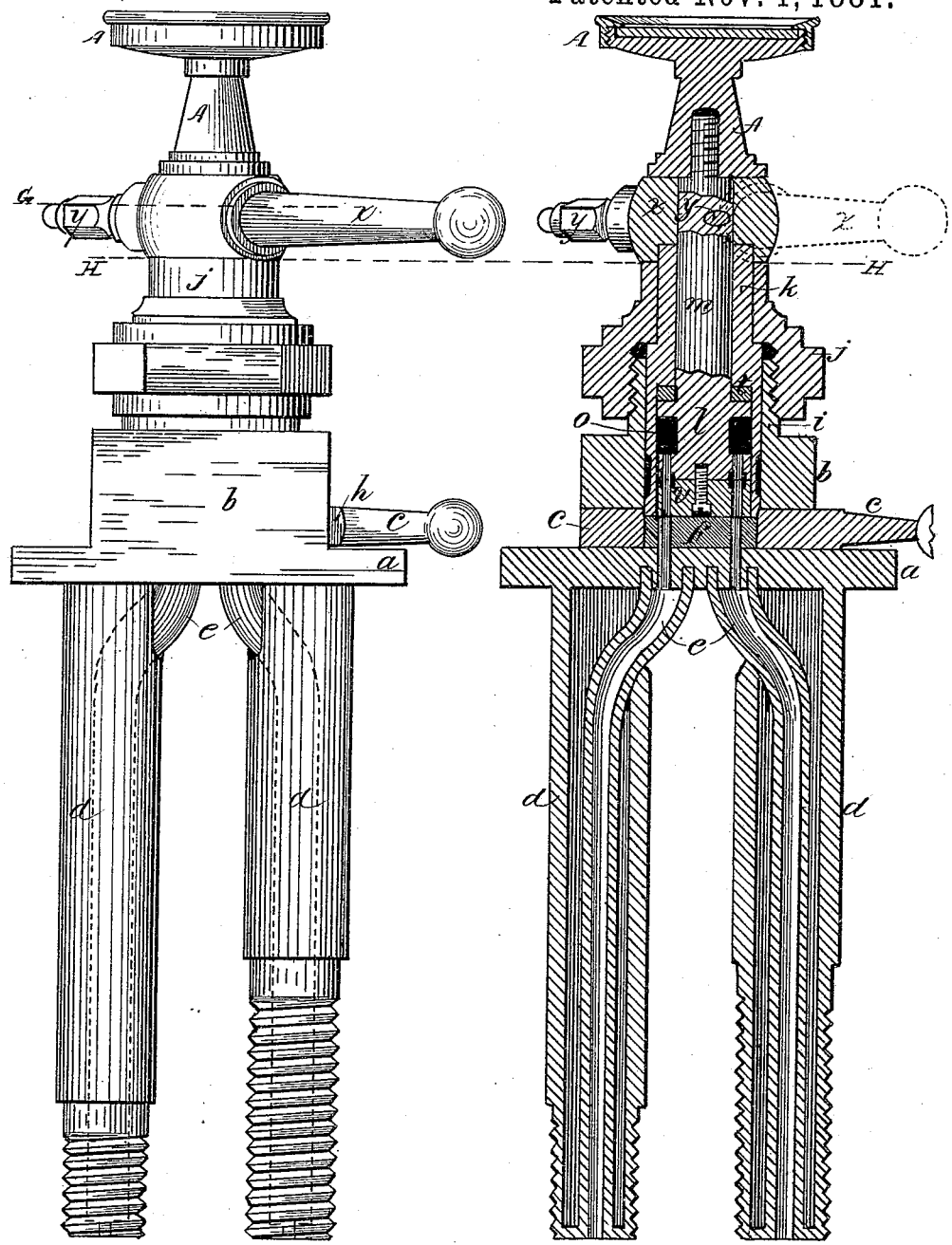

UNITED STATES PATENT OFFICE.

WILLIAM P. CLARK, OF MEDFORD, MASSACHUSETTS.

APPARATUS FOR DRAWING SODA-WATER AND OTHER BEVERAGES.

SPECIFICATION forming part of Letters Patent No. 248,918, dated November 1, 1881.

Application filed August 15, 1881. (No model.)

*To all whom it may concern:*

Be it known that I, WILLIAM P. CLARK, of the town of Medford, in the State of Massachusetts, have invented Improvements in Apparatus for Drawing Soda-Water and other Beverages, of which the following is a specification.

This invention relates to certain improvements in the apparatus shown and described in Letters Patent of the United States No. 222,869, granted to me on the 23d day of December, 1879; and the invention will, in connection with the accompanying drawings, be hereinafter fully described, and specifically defined in the appended claims.

Figure 1 is a side elevation of the apparatus as assembled. Fig. 2 is a longitudinal vertical section of Fig. 1. Fig. 3 is a horizontal section taken on line G, Fig. 1, the axial locking-spindle $y$ and a part of lever $x$ being shown in plan. Fig. 4 is a horizontal transverse section taken on line H H, Figs. 1 and 2. Fig. 5 is a perspective view of the lower portion of the valve, the removable face being shown in sectional perspective. Fig. 6 is a perspective view of the upper portion of the valve-stem, and also of the valve-sleeve. Fig. 7 is a perspective view of the packing-holder, with the packing inserted therein. Fig. 8 is a perspective view of the valve-lever, a portion of the handle being broken away. Fig. 9 is a top or plan view of the base or bed, and showing the position of the packing-holder therein, partly by dotted lines, with packing therein inserted. Fig. 10 is an inverted or under-side plan view of the valve-sleeve and the detachable valve-face.

In said views, $a$ represents the metallic base or bed, which is designed to be seated upon the marble slab or other body to which the apparatus is to be attached.

Upon bed $a$ is formed the raised portion $b$, through which is formed a passage or slot for the packing-holder $c$, as also a connecting vertical passage in which the valvular devices are arranged, as will be described.

Upon the under side of bed $a$ are formed the inlet and outlet tubes $d$ $d$, by means of threaded nuts upon which the apparatus is secured to the slab or other body upon which it is seated, and through which said tubes pass, in the usual manner, and to which the usual conduit-pipes are to be coupled. Said tubes $d$ $d$ may be so constructed and arranged as to serve as the immediate or actual conduits of the liquids passing through the apparatus; or the small inclosed tubes $e$ may and preferably are employed, as shown, in order that the liquid shall pass through purer and less corrodible metal than tubes $d$ would necessarily be composed of.

The packing-holder $c$ is formed of metal, hard rubber, or other rigid material, and with a circular passage through it so positioned that when the shoulders $h$ $h$ are in contact with the raised portion $b$ packing $f$ will be coincident with the vertical circular passage in said part $b$. In bed $a$ are formed two vertical passages coincident with the axial passages in the interior tubes, $e$, and in packing $f$ are two passages, $g$, which coincide with said passages in bed $a$, as is clearly shown in Fig. 2. An externally-threaded sleeve or wall, $i$, is formed upon part $b$, with an axial passage coincident with that in $b$, and a common compression-nut, $j$, is internally threaded to fit to wall $i$. A sleeve or cylinder, $k$, is formed with its lower and larger section to fit the passage in part $b$ and wall $i$, while its upper and diminished section fits the upper and non-threaded portion of the nut $j$, and the shoulder thus formed on said sleeve by the disparity of the diameter of its two sections is engaged by the shoulder in the nut caused by its two different internal diameters, whereby the downward action of the nut serves to firmly seat the lower end of the sleeve upon the perforated packing $f$ adjacent to the periphery thereof. A valve, $l$, is formed with a diameter to fit the lower and larger section of the passage in sleeve $k$, while its stem $m$ fits the upper and smaller section of the passage in said sleeve.

Upon the lower end or face of valve $l$ is secured a detachable disk-like face, $v$, formed of the most indestructible metal, and secured to the valve by an axial screw, as shown in Fig. 2, it being held from rotation by the tubes $p$ $p$, Fig. 5, which are secured in the end of the valve and enter coincident holes in said disk. (Shown in said Fig. 5.) Said tubes constitute a continuation of the small passages before described, which lead from the small tubes $e$ up through bed $a$, packing $f$, disk $v$, said tubes $p$, and the lower portion or collar s of valve l, to the concentric groove o, Figs. 2, 5.

Between the external shoulder of valve l (at the intersection of its body and stem m) and the internal shoulder in sleeve k a ring-packing, t, is interposed, and hence, when the compression-nut j is forced down, it not only seats and packs sleeve k on the disk-packing f, but it packs said internal shoulder of the sleeve upon said ring-packing t, and the face of the valve is at the same time packed upon the packing-disk f, so that the liquid which may be admitted (under any desired pressure) through one of the tubes e into the groove o in valve l cannot escape in any direction, except through the passage that leads into the other small tube e, and thence through the connected conduit or pipe.

For the purpose of partially rotating valve l, in order to bring the passages in the valve in coincidence with those in packing f, or to break such connection, the usual handle, x, is secured on stem m by a spline or key, z, which secures the same from torsional displacement, while the axial spindle y, threaded in said handle, and which receives, in part, the downward force exerted by the tablet-knob A, threaded on spindle m, secures said handle from vertical or other derangement. For the purpose of arresting the rotation of valve l when rotated by lever x, a portion of the upper part of sleeve k is cut away to form the two stops a', (shown in Figs. 4, 6,) which by the contact of pins z arrest said valve, and the hub or enlarged portion of lever x is formed with a curtain, b', which extends downward below the head of said sleeve and covers said seats a, thereby concealing the same, and the spline z, so that both said lever and sleeve present a symmetrical appearance.

To prevent the rotation of sleeve k when valve m is actuated, a stud, c', Fig. 10, is formed thereon, which is seated in the slot d', Fig. 9, in the interior of wall i, which rises from part b.

By forming the inlet and outlet tubes d d both on bed a, instead of forming one of them thereon and then connecting the other removably with such fixed tube, as in my said patent of 1879, important advantages are derived, among which are the facts that the apparatus is more symmetrical and compact, for the reason that the packing-holder f has the same position relatively to both the inlet and outlet tubes, and the bed and both said tubes constitute a single compact casting, which obviates the necessity of fitting one tube into the other, and by so forming the bed and tubes, and with the non-rotating sleeve and the rotary valve, the liquid is conducted both up and down through the same packing, and changes its course from up to down within the valve-chamber, and by forming the non-rotating sleeve k to press upon packing f outside the valve a rotary valve may be employed without confining said packing by interlocking it with the inclosing-wall, as would otherwise be necessary. By combining the rigid packing-holder e with the packing-disk f the latter is secured from lateral displacement, especially at such points thereof as are less compact and unyielding than other parts; and by the arrangement of sleeve k and the valve the pressure in plane upon both packing-disk f and ring t insures a tight joint regardless of the contact of said ring with valve-stem m, or of said disk f with the inclosing-wall, as was necessary in my said patent of 1879; and, besides, by the said construction, the valve is actuated by the mere vibrations of lever x, whereas in my said patent of 1879 it was necessary to raise the valve by the slow process of the screw thereon in order to give vent to the liquid; and, lastly, by curtaining lever x, as at b', the unsightly notch in the sleeve is concealed, and by securing the stop-pin z in lever x instead of in stem m, as has been the practice, the lever is not worked loose on the stem by the shocks resulting from the violent opening and closing of the valve, and the impact of the pin with the stop a', and the axial pin y serves both the purpose of an ornament and to secure lever x from being worn loose on stem m; and by forming packing-holder e with a tapering body it is removed or replaced with greatly-increased facility; and by the described arrangement of the sleeve, the valve, its lever, and compression-nut the turning up of the latter raises the valve and sleeve and releases the packing f and its holder c.

I claim as my invention—

1. In a draft apparatus having an open passage for the insertion and removal of the packing, a removable metallic or rigid packing-holder having an open passage for the seating and securing of the packing, substantially as specified.

2. In an apparatus having the inlet and outlet passages communicating with the valve-chamber, as described, the rotary valve formed with a groove or chamber, o, to serve as a passage from the inlet to the outlet passage within the valve-chamber, substantially as specified.

3. In a draft apparatus, the combination of packing f, the locked sleeve k, seated directly upon said packing, and the rotary valve l within said sleeve and seated upon said packing, and having a passage or passages communicating with the passage or passages in such packing, substantially as specified.

4. The combination of the locked sleeve k, having the stops a' a', the rotating valve l, its actuating-lever x, and the pin z, arranged as a spline in said lever and valve, and as a stop to engage stops a' in said sleeve, substantially as specified.

5. The combination of valve l, lever x, axial pin y, and tablet-knob A, threaded upon the stem of said valve and arranged by its pressure upon said lever to lock said pin in position, substantially as specified.

6. The combination of seats or stops a' a', and lever x, with its stop-pin z, and curtain b', to inclose such stops and stop-pin, substantially as specified.

7. In a draft apparatus, the combination of the concentric threaded wall $i$, valve $l$, lever $x$, and the packing-nut $j$, constructed and arranged to automatically raise said valve by the contact of the upper wall of said nut with said lever, when the said nut is turned upward upon the threads of wall $i$, substantially as specified.

8. In a draft apparatus, the perforated packing $f$, sleeve $k$, seated directly upon and securing said packing in position by pressure thereon, and the rotary valve inclosed within said sleeve and seated upon said packing, substantially as specified.

9. In a draft apparatus, the combination of bed $b$, having the inlet and outlet passages thereto formed or secured, the packing $f$, provided with corresponding passages, and a rotary valve, also provided with corresponding passages, and with a passage within such valve to connect said inlet and outlet passages, substantially as specified.

10. The combination of sleeve $k$, having an interior and exterior shoulder, the valve $l$, having an exterior shoulder, the ring-packing $t$, seated between said valve and sleeve, and the internally shouldered and threaded compression-nut $j$, arranged by its contact with the external shoulder of said sleeve to compress said ring-packing, substantially as specified.

11. The packing-holder $c$, formed with taper or oblique edge lines to facilitate its removal from or replacement in the body of the apparatus, substantially as specified.

WILLIAM P. CLARK.

Witnesses:
T. W. PORTER,
H. H. LETTENEY.